(12) United States Patent
Doelle et al.

(10) Patent No.: US 8,132,465 B1
(45) Date of Patent: Mar. 13, 2012

(54) SENSOR ELEMENT PLACEMENT FOR PACKAGE STRESS COMPENSATION

(75) Inventors: Michael B. Doelle, Mountain View, CA (US); Joachim Bergmann, Iserlohn (DE)

(73) Assignee: Silicon Microstructures, Inc., Milpitas, CA (US)

( * ) Notice: Subject to any disclaimer, the term of this patent is extended or adjusted under 35 U.S.C. 154(b) by 757 days.

(21) Appl. No.: 12/184,159

(22) Filed: Jul. 31, 2008

Related U.S. Application Data

(60) Provisional application No. 60/953,446, filed on Aug. 1, 2007.

(51) Int. Cl.
*G01L 9/00* (2006.01)
*G01L 9/16* (2006.01)

(52) U.S. Cl. ............... 73/754; 73/715; 73/717; 73/753; 361/283.4

(58) Field of Classification Search .................. None
See application file for complete search history.

(56) References Cited

U.S. PATENT DOCUMENTS

| | | | |
|---|---|---|---|
| 3,213,681 A | 10/1965 | Pearson | |
| 3,377,528 A | 4/1968 | Toussaint et al. | |
| 3,440,873 A | 4/1969 | Eichelberger et al. | |
| 3,978,508 A | 8/1976 | Vilkomerson | |
| 4,317,126 A | 2/1982 | Gragg | |
| 4,432,007 A * | 2/1984 | Cady | 257/417 |
| 4,622,856 A | 11/1986 | Binder et al. | |
| 4,771,639 A | 9/1988 | Saigusa et al. | |
| 4,791,465 A | 12/1988 | Sakai et al. | |
| 4,812,888 A * | 3/1989 | Blackburn | 257/254 |
| 4,889,590 A | 12/1989 | Tucker et al. | |
| 4,894,698 A | 1/1990 | Hijikigawa et al. | |
| 4,906,586 A * | 3/1990 | Blackburn | 438/53 |
| 5,058,435 A * | 10/1991 | Terry et al. | 73/727 |
| 5,155,061 A | 10/1992 | O'Connor et al. | |
| 5,178,016 A | 1/1993 | Dauenhauer et al. | |
| 5,191,237 A | 3/1993 | Takebe | |
| 5,279,162 A * | 1/1994 | Takebe et al. | 73/726 |
| 5,281,836 A | 1/1994 | Mosser et al. | |
| 5,296,408 A * | 3/1994 | Wilbarg et al. | 216/2 |
| 5,454,270 A * | 10/1995 | Brown et al. | 73/720 |
| 5,576,251 A * | 11/1996 | Garabedian et al. | 438/53 |
| 5,578,843 A * | 11/1996 | Garabedian et al. | 257/254 |
| 5,652,445 A | 7/1997 | Johnson | |
| 6,011,273 A * | 1/2000 | Ichikawa et al. | 257/57 |

(Continued)

OTHER PUBLICATIONS

Doelle, Michael, "Field Effect Transistor Based CMOS Stress Sensors," (topic of patent—utilization of an FET-based stress sensors in conjunction with a pressure sensor membrane to realize pressure sensors with some attractive features compared to the piezo-resistor pressure sensors that we currently make); IMTEK, University of Frieburg; pp. 5-6, 39-42, 46-48, 50-51, 75-77 and 92-94.

*Primary Examiner* — Lisa Caputo
*Assistant Examiner* — Jermaine Jenkins
(74) *Attorney, Agent, or Firm* — Kilpatrick Townsend & Stockton LLP

(57) ABSTRACT

Circuits, methods, and systems that calibrate or account for packaging and related stress components in a pressure sensor. Further examples provide an improved sensor element or device. One example provides one or more sensing elements on the diaphragm and near the diaphragm-bulk boundary. Sensors near the diaphragm-bulk are used to estimate package-induced stress. This estimation can then be used in calibrating package stress from pressure measurements.

21 Claims, 9 Drawing Sheets

U.S. PATENT DOCUMENTS

| | | |
|---|---|---|
| 6,294,133 B1 * | 9/2001 | Sawada et al. ............. 422/82.01 |
| 6,308,577 B1 | 10/2001 | Baskett et al. |
| 6,318,183 B1 | 11/2001 | Czarnocki |
| 6,427,539 B1 | 8/2002 | Chen et al. |
| 6,531,331 B1 | 3/2003 | Bennett et al. |
| 6,880,406 B2 * | 4/2005 | Yang ............................... 73/754 |
| 7,124,638 B2 | 10/2006 | Kandler |

* cited by examiner

SENSOR ELEMENT PLACEMENT FOR PACKAGE STRESS COMPENSATION

CROSS-REFERENCES TO RELATED APPLICATIONS

This application claims the benefit of U.S. provisional application No. 60/953,446, titled Pressure Sensor Based on Field Effect Transistor With Multiple Terminals, filed Aug. 1, 2007.

BACKGROUND

Pressure sensors have become ubiquitous the last several years, finding their way into many applications, such as tire pressure monitor systems (TPMS), manifold absolute pressure (MAP) applications for example in automotive exhaust lines, automatic transmission gear boxes, consumer applications involving barometric pressure measurements, and others.

These pressure sensors are typically formed on a silicon die having a diaphragm over a cavity, where the diaphragm is supported by a sidewall or bulk region. One or more sensors, such as a Wheatstone bridge consisting of diffused or implanted resistors, are located on the diaphragm. Pressure, either from above the diaphragm or below in a cavity, deflects the diaphragm and its sensors. This deflection, and hence the pressure, can be measured by utilizing the piezo-resistive effect. That is, as the sensors are stressed due to the bending of the diaphragm, the piezo-resistive effect changes the value of one or more of the resistors that are typically configured in the Wheatstone bridge. This change in resistance results in a change in the output of the Wheatstone bridge from which the change in pressure can be inferred.

Pressure sensors are typically placed in a package or other housing. The package or housing enables the electrical connectivity and protects the pressure sensors against its environment. For example, they may be fixed to a surface and partially covered in plastic. This packing often tends to stretch or compress the pressure sensor die. This in turn induces stress on the device's diaphragm. This stress may be indistinguishable from the pressure that the device is intended to measure, and it may create offsets and other errors in the pressure sensor output. While the effects of this stress may be initially removed by the calibration of the device, the stress may change over time and temperature, with this change in stress appearing as a change in the output of the pressure sensor.

Thus, what is needed are circuits, methods, and systems that calibrate or account for these variable packaging and related stress components. In order to accurately account for this, it is further desirable to have available an improved sensor element or device to use in place of the simple Wheatstone bridge.

SUMMARY

Accordingly, embodiments of the present invention provide circuits, methods, and systems that calibrate or account for variable packaging and related stress components in a pressure sensor. Further embodiments provide an improved sensor element or device.

An exemplary embodiment of the present invention provides one or more sensing elements on the diaphragm and one or more sensing elements on or near the transition between the thin diaphragm and the thicker frame or bulk silicon that supports it. Sensors near the diaphragm-bulk boundary are used to estimate package-induced stress. This estimation can then be used in calibrating out the package stress from pressure measurements. This estimation can be performed continuously or periodically in order to compensate for changes in package induced stress over time and temperature variations.

Another exemplary embodiment of the present invention provides a sensor device having an improved sensitivity and which can measure stress in multiple crystal directions. The use of this sensor device enables a more accurate calibration of the package stress, as well as improved pressure measurement. One example provides a field-effect transistor (FET) having multiple source-drain regions. One specific example includes eight source-drain regions. The FET can be used in two configurations, each at an angle to one another. In a specific embodiment, the angle is determined by crystal directions, for example, 45 degrees for silicon. These modes allow measurements along two crystal directions to be taken, thus providing more data on the mechanical stress state.

Another exemplary embodiment of the present invention provides an improved algorithm for utilizing measurement data from the sensor devices on the diaphragm and near the diaphragm-bulk boundary.

One such algorithm considers the calibration problem to be a so-called ill-posed inverse problem. Inverse solution techniques are used to find a solution. The algorithm accounts for factors that include, but are not limited to, the pressure applied to the diaphragm and the temperature. A package stress correction function is found by accumulating a mechanical stress factor for one or more of the sensing elements. Each mechanical stress factor is determined by considering a sensing element voltage signal, a piezoresistance coefficient, a geometrical correction factor, a sensing element bias current, and a sensing element resistance.

Various embodiments of the present invention may incorporate these and the other features described herein. A better understanding of the nature and advantages of the present invention may be gained by reference to the following detailed description and the accompanying drawings.

DESCRIPTION OF EXEMPLARY EMBODIMENTS

Figure 1:
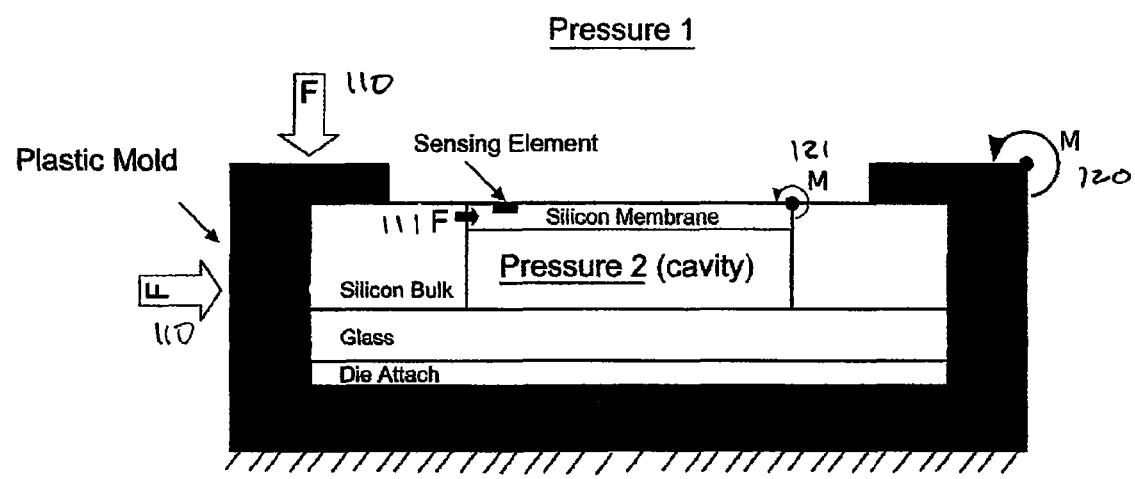
FIG. 1 illustrates the mechanical environment of a pressure sensor in a package, such as a plastic molded package.

FIG. 1 illustrates the mechanical environment of a pressure sensor in a package, such as a plastic molded package. This packaging often has a significant influence on the performance of a pressure sensor device. Forces (F) 110 and moments (M) 120 are applied, in this example, to the plastic molded package, translate through the silicon bulk into the silicon diaphragm. The forces and moments result in forces 111 and moments 121 that are applied to the diaphragm itself, which lead to a parasitic contribution to the pressure sensor signal measured using the sensing element on the silicon diaphragm. Accordingly, embodiments of the present invention provide sensing elements and a method to compensate the parasitic mechanical contribution to the pressure sensor signal.

Figure 2:
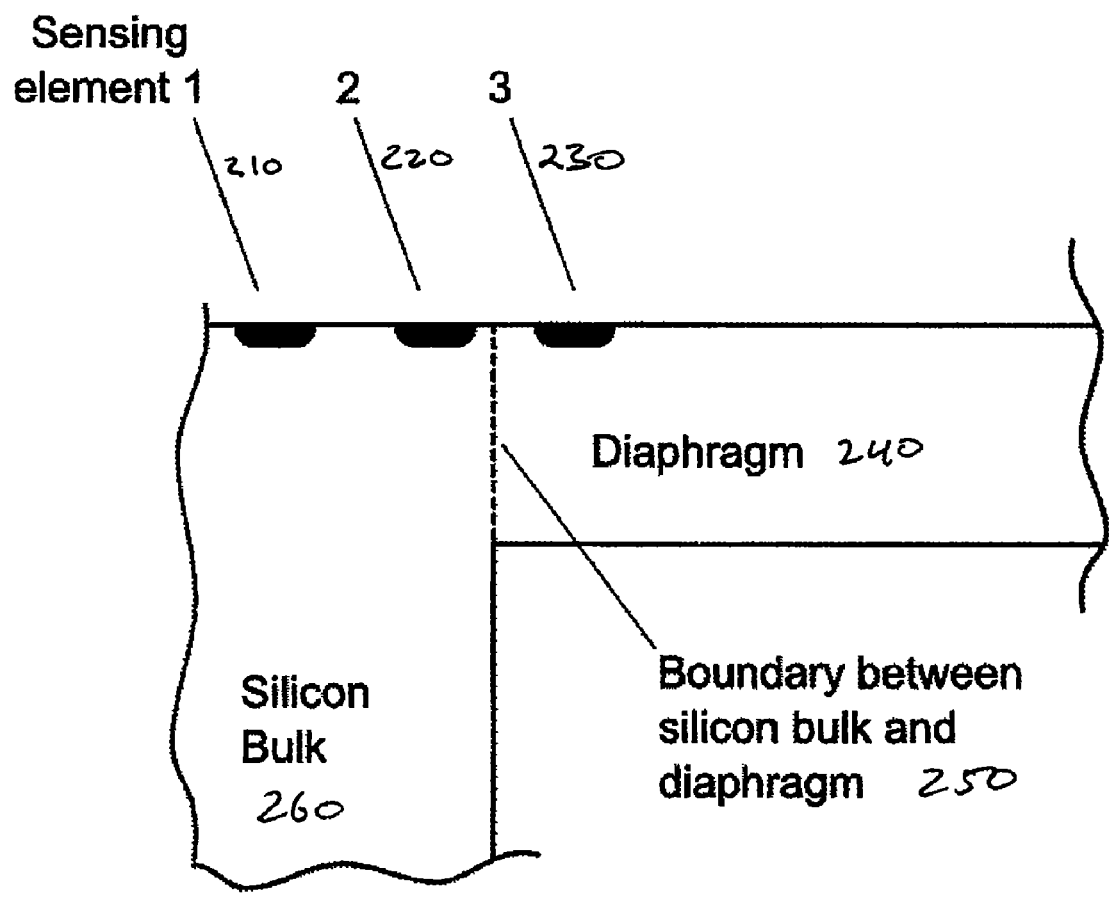
FIG. 2 illustrates a multitude of stress-sensing elements on a bulk and one or more sensing elements on a diaphragm to be used in the calibration of external parasitic mechanical stresses according to an embodiment of the present invention.

FIG. 2 illustrates a multitude of stress-sensing elements on a thicker portion of a silicon die (silicon bulk) and one or more sensing elements on a thinner portion of the silicon die (diaphragm) to be used in the calibration of external parasitic mechanical stresses. This example shows two sensing elements 210 and 220 on the silicon bulk close to the boundary between the bulk 260 and the diaphragm 240 and one sensing element 230 on the silicon diaphragm 240 close to the boundary 250. Effectively, in this example, sensing elements 1 210 and 2 220 are used to estimate the mechanical state of the boundary 250 between the bulk 260 and the diaphragm 240 and thus the mechanical clamping of the diaphragm 240. This enables compensation of forces and moments coupling into sensing element 3 230 from the package and thus provides a pressure sensor that is less susceptible to parasitic mechanical forces.

Figure 3:
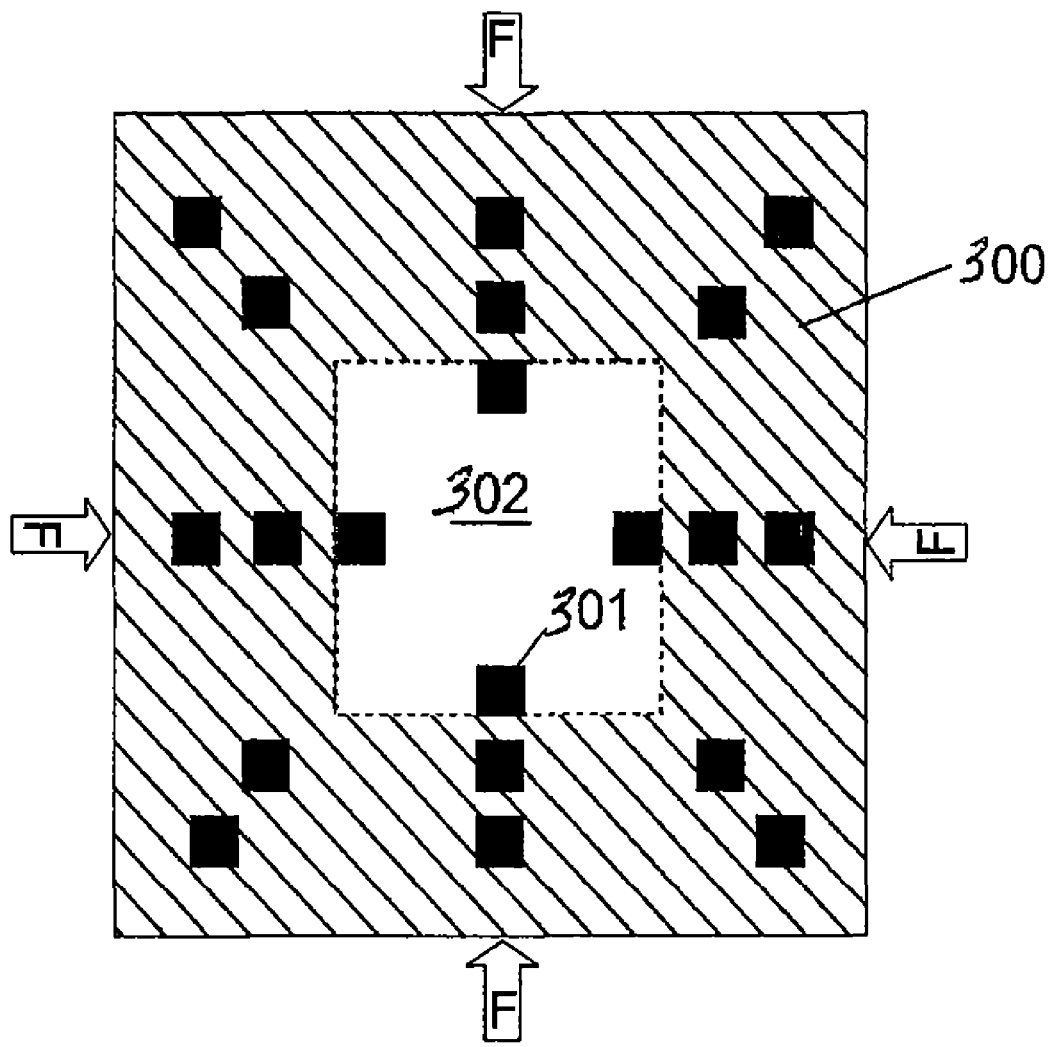
FIG. 3 is a schematic top view showing an exemplary number and distribution of sensing elements located on a diaphragm and a bulk according to an embodiment of the present invention.

FIG. 3 is a schematic top view showing an exemplary number and distribution of sensing elements 301 located on a diaphragm 302 and a bulk 300. The sensing elements 301 on the bulk 300 and the diaphragm 302 are both used to quantify and compensate the influence of forces and moments on the boundary condition of the diaphragm. The number and location of sensing elements on the bulk and on the diaphragm varies in different embodiments of the present invention.

The multitude of stress sensing elements as shown in FIG. 3 leads to an additional set of requirements that cannot be fulfilled by conventional sensing elements configured in a simple Wheatstone bridge. One requirement is that it is preferred that the stress-sensing elements have a small footprint to enable point-like sampling of the distribution of mechanical stress. In addition, a simple switching mechanism is preferred to be able to select an individual stress-sensing element from the multitude of sensors such that its output can be read. It is also desirable to be able to extract more than one mechanical stress component from one single sensing element, since this increases the amount of data available for stress compensation.

Accordingly, embodiments of the present invention replace the Wheatstone bridge with a field effect transistor (FET) based device. This addresses the above requirements. Specifically, embodiments of the present invention provide FET based sensing elements that extract more than one mechanical stress component and are thus well-suited for package stress compensation routines provided by embodiments of the present invention.

The package stress compensation approach is improved by extracting as much stress information from the sensing elements as possible. One sensing element that provides this is shown in the following figure.

Figure 4:
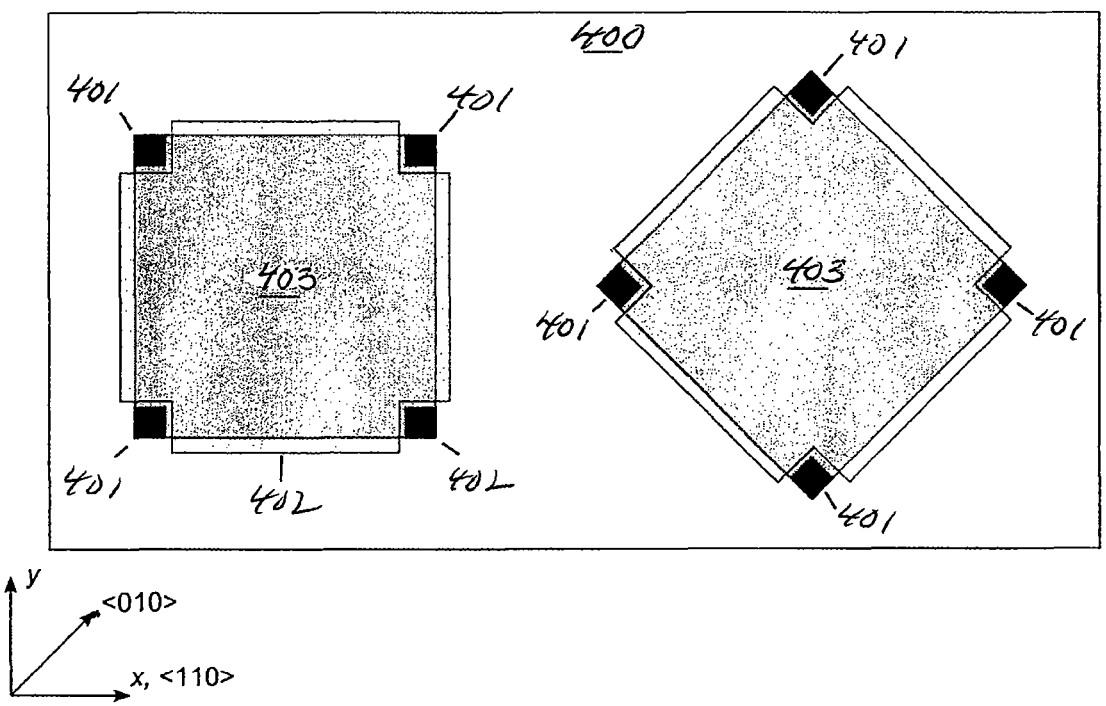
FIG. 4 illustrates a stress-sensing element consisting of two field effect transistors (FETs) with four source/drain terminals according to an embodiment of the present invention.

FIG. 4 illustrates a stress-sensing element consisting of two field effect transistors with four source/drain terminals. A gate electrode 402 is positioned over the active area 403 of the transistor. The location of the sensing element on the silicon chip varies such that 400 is either the thin diaphragm portion of the silicon chip or the thick silicon bulk. The FET on the left side of the sensing element measures shear stress components in the <010> crystal direction, whereas the FET on the right side is sensitive to components in the <110> crystal direction. Thus, two independent shear stress components can be measured with this sensing element making it more suitable as a sensing element to be used as shown in the top view of FIG. 3.

Figure 5:
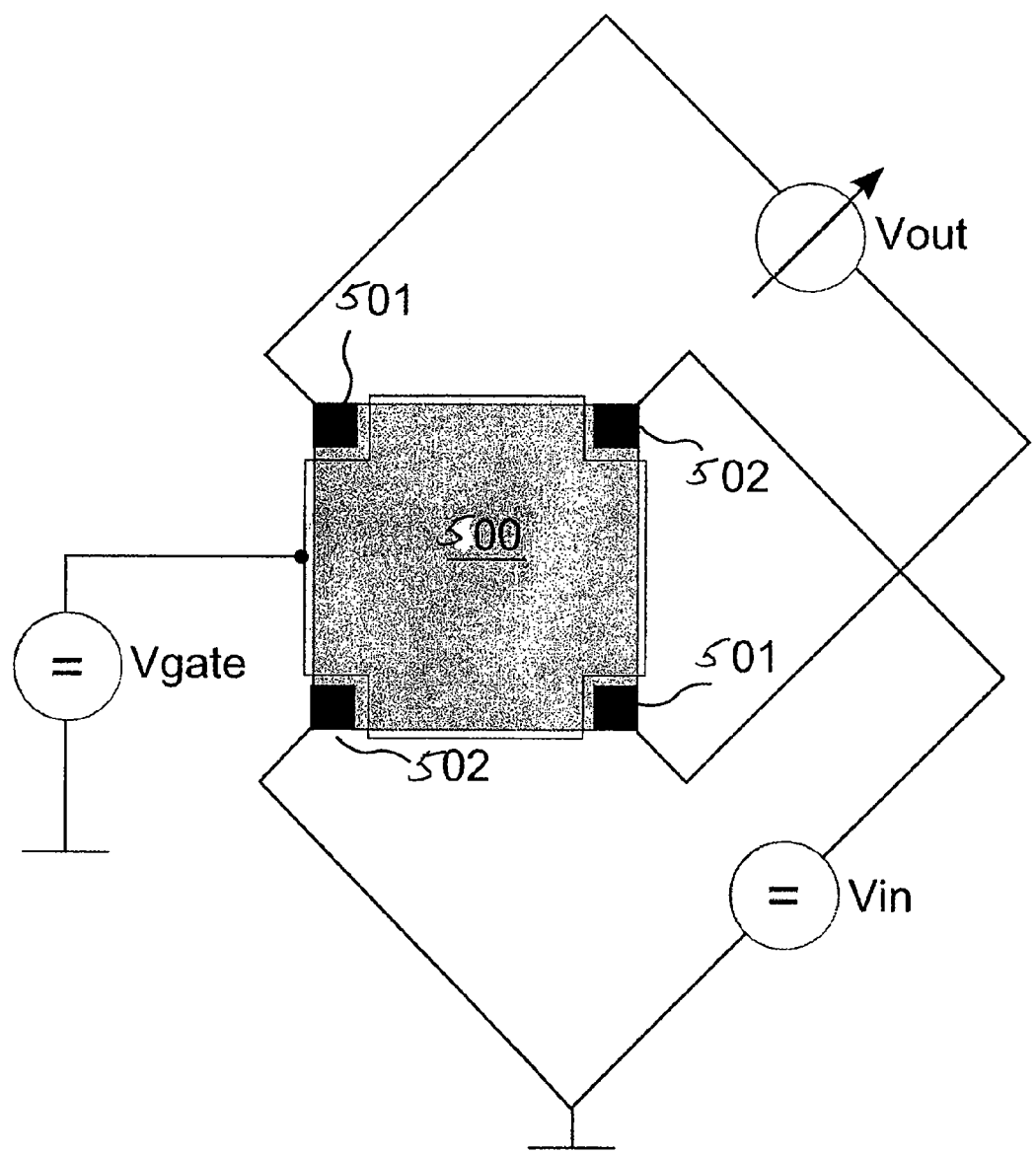
FIG. 5 illustrates the operation of each FET within a sensing element according to an embodiment of the present invention.

FIG. 5 illustrates the operation of each FET within a sensing element according to an embodiment of the present invention. A voltage, Vin, is applied between two of the four source-drain contacts 502. A second voltage, Vgate, above the threshold voltage of the transistor is applied to the gate electrode in such a way that the channel of the FET is inverted and current between the two biased source/drain contacts 502 flows. Mechanical shear stress applied in the current flow direction then leads to a measurable output voltage, Vout, between two source/drain contacts 501 perpendicular to the current flow between contacts 502. The output voltage Vout is proportional to said mechanical shear stress. The current flow direction can be changed in steps of 90 degrees between contacts 501 and 502 by changing the contact pair that is biased using Vin. Accordingly, for different current flow direction, the contacts used to measure Vout are changed. The switching enables a canceling of parasitic effect, e.g., the influence of magnetic fields.

Figure 6:
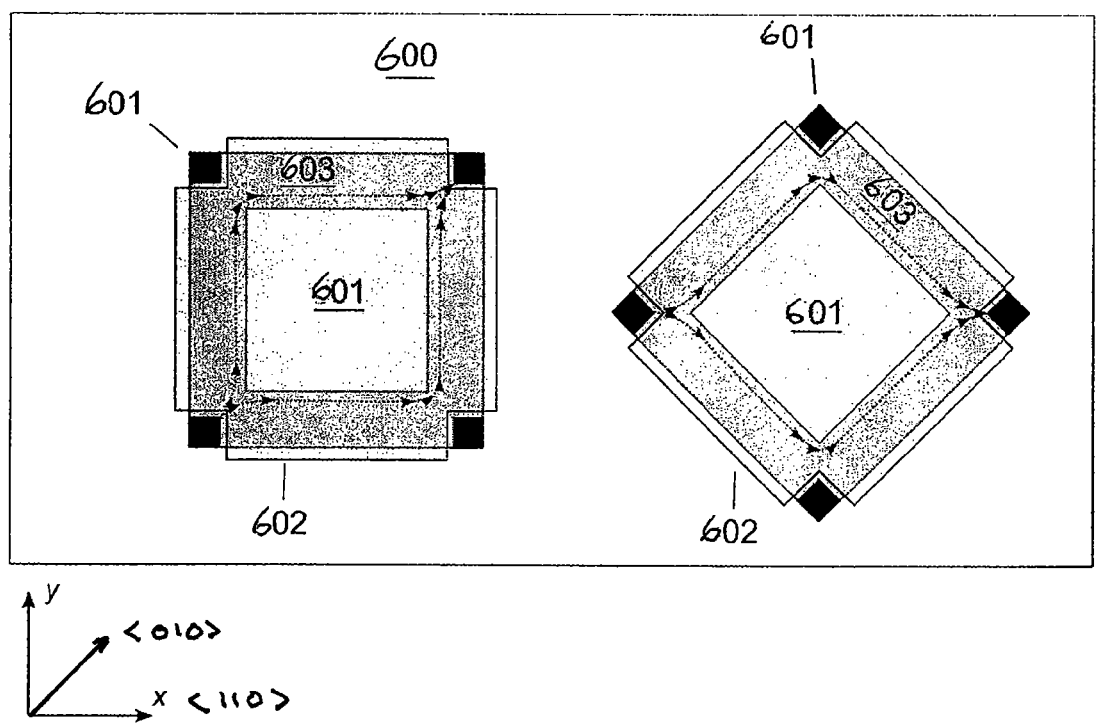
FIG. 6 illustrates an improved sensing element according to an embodiment of the present invention.

FIG. 6 illustrates an improved sensing element according to an embodiment of the present invention. Specifically, the sensing element shown in FIG. 4 is improved by introducing a non-conducting area 601 into the channel/active area 603 of the FET. This increases the resistance between the two output contacts 601 perpendicular to the current flow direction indicated by the arrows. The increased resistance leads to a decreased error of the output voltage measurement. The non-conducting area can be realized by a) doping area 601 with an impurity type opposite of the impurity type in area 603 b) prohibiting the charge carrier inversion in area 601 by introducing a thick oxide in area 601 or c) prohibiting the charge carrier inversion in area 601 by not having a gate electrode on top of non-conducting area 601.

The sensing elements shown in FIG. 4 and FIG. 6 have the disadvantage that the stress information on shear stress along <010> and <110> originates from two different sensing elements and thus two different locations. This limits the spatial resolution and thus the accuracy of the package compensation approach. A solution to this problem is disclosed in the following figure.

Figure 7:
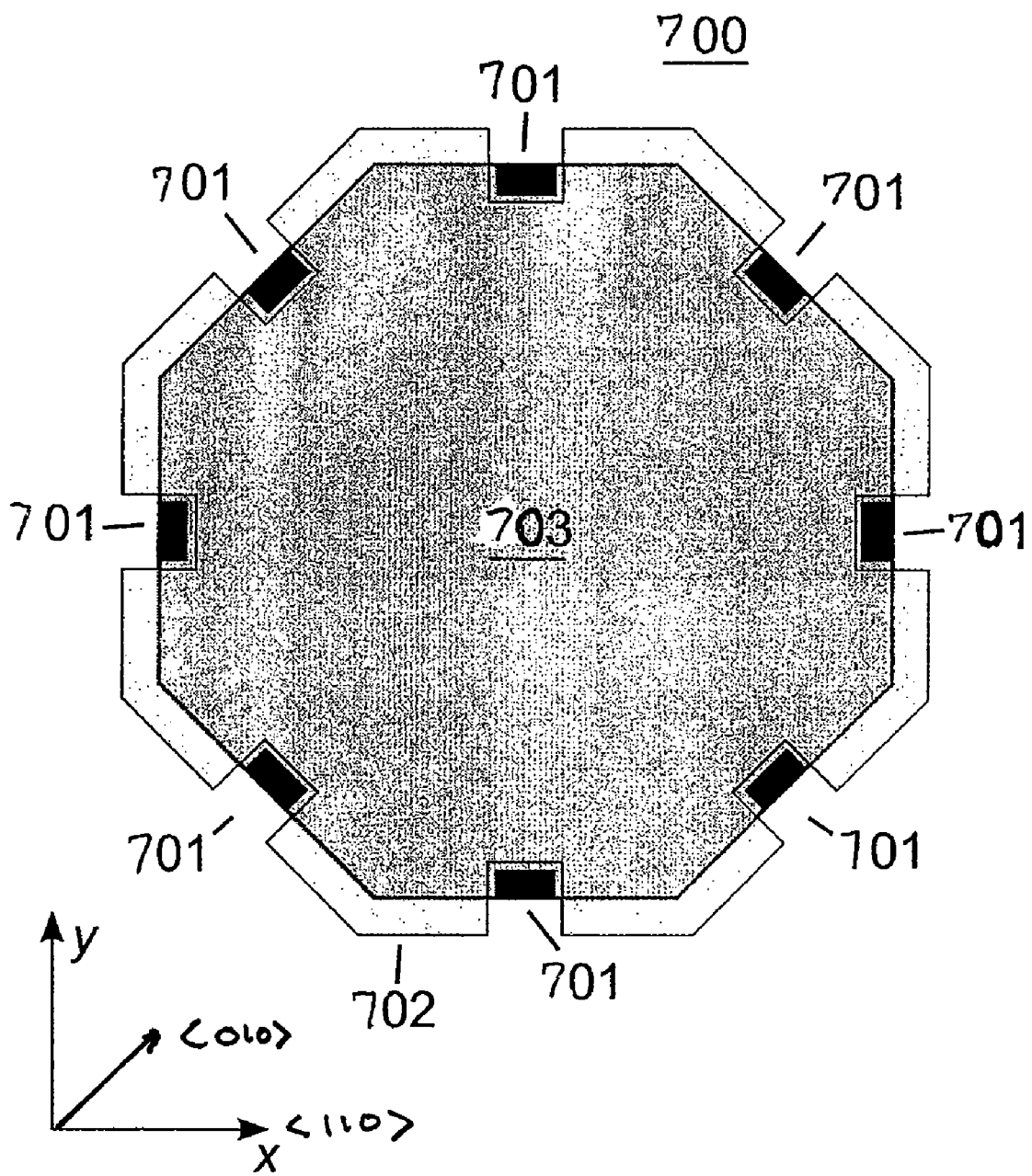
FIG. 7 illustrates a stress-sensing element consisting of one field effect transistor with eight source/drain terminals according to an embodiment of the present invention.

FIG. 7 illustrates a stress-sensing element consisting of one field effect transistor with eight source/drain terminals. A gate electrode 702 is positioned over the active area 703 of the transistor. The location of the sensing element on the silicon chip varies such that 700 is either the thin diaphragm portion of the silicon chip or the thick silicon bulk. Depending on the current flow direction between contacts 701 with respect to the silicon crystal the response of the sensing element will correspond to either the shear stress components in the <010> crystal direction or the shear stress component in the <110> crystal direction.

Figure 8:
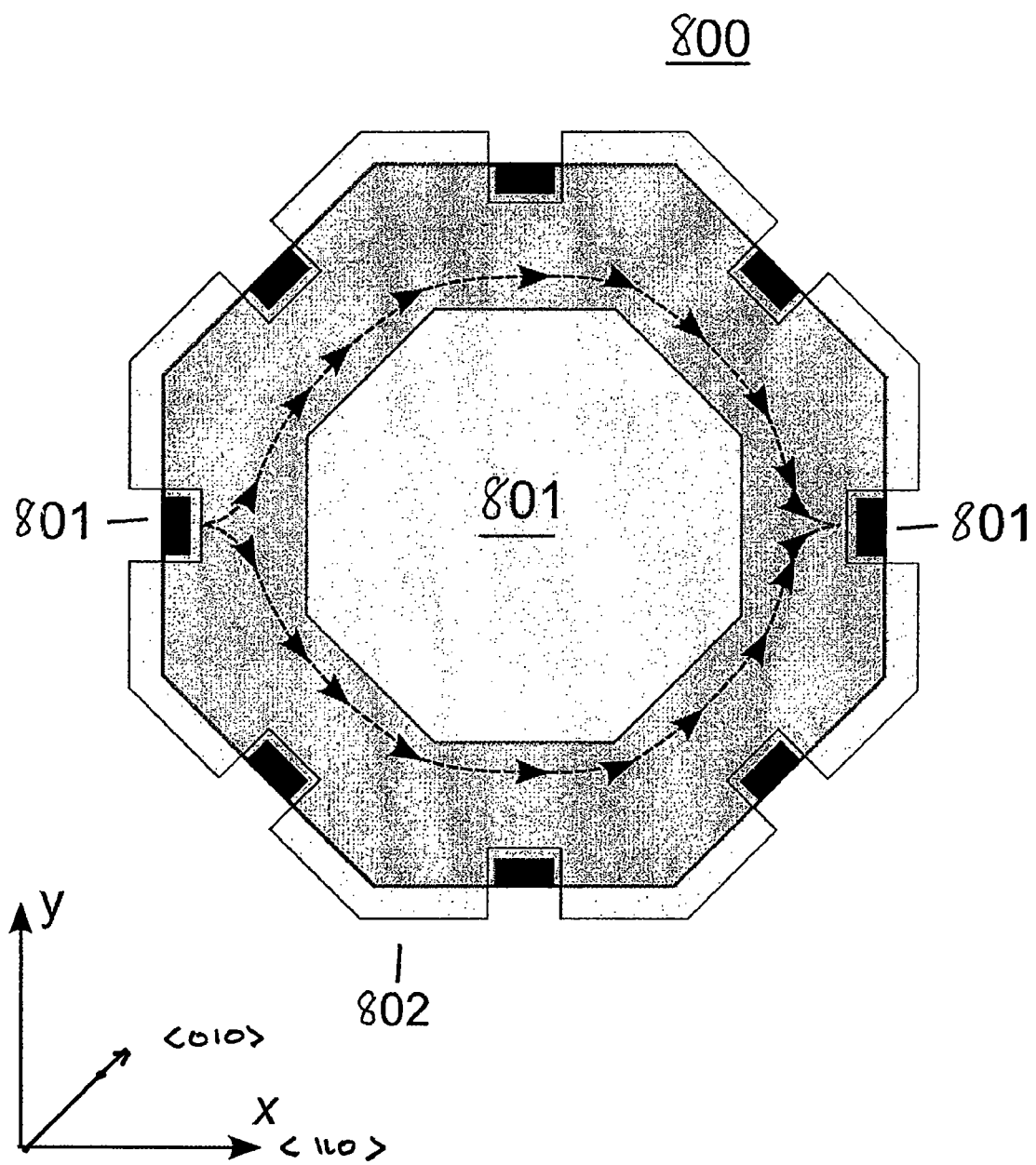
FIG. 8 illustrates an improved stress-sensing element according to an embodiment of the present invention.

FIG. 8 illustrates an improved stress-sensing element according to an embodiment of the present invention. Specifically, the sensing element shown in FIG. 7 is improved by introducing a non-conducting area 801 into the channel/active area 803 of the FET. The different options of implementing such a non-conducting island 801 are identical to the ones mentioned for FIG. 6.

Figure 9:
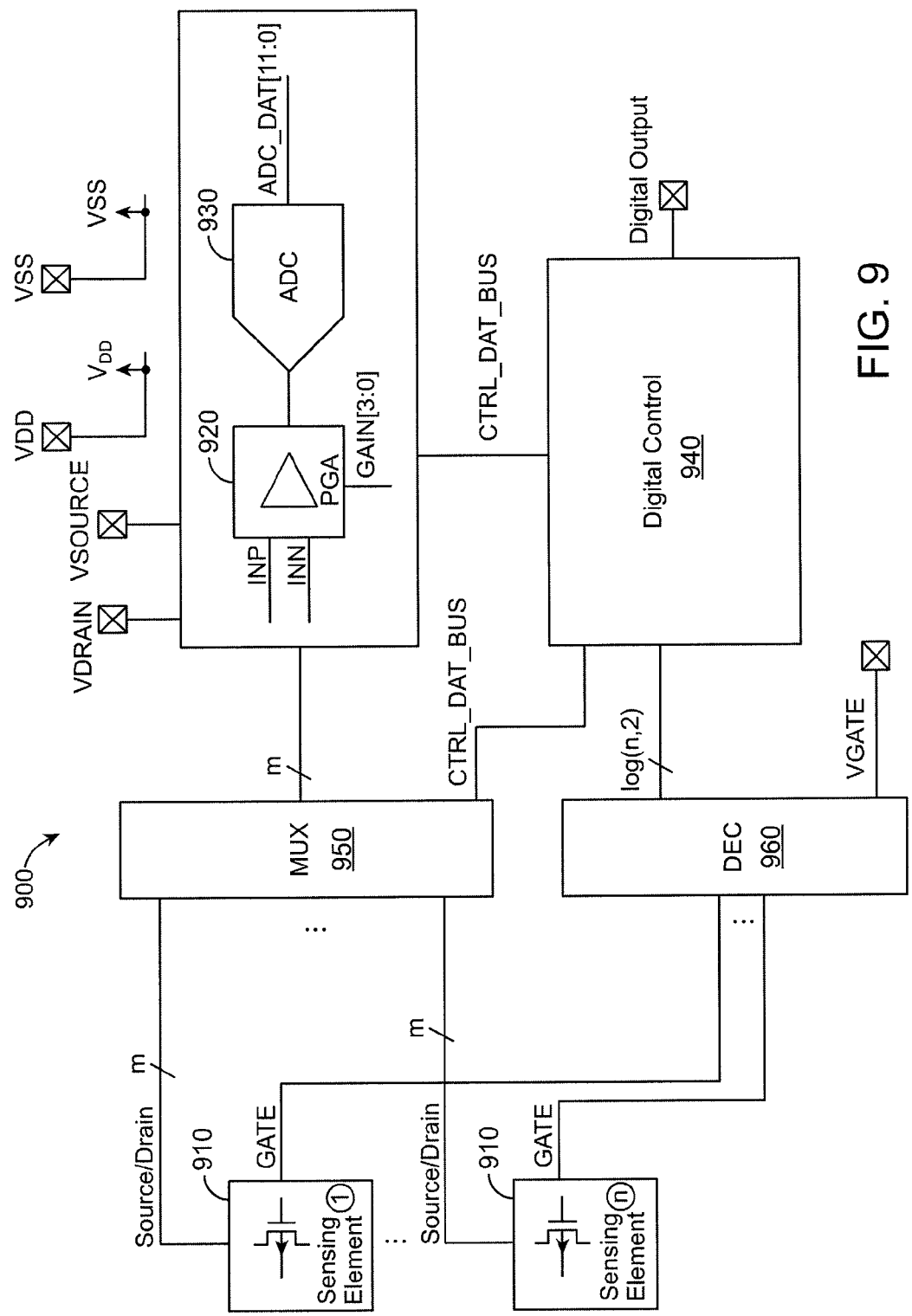
FIG. 9 illustrates circuitry added to the pressure sensor die to read and process the stress data that are measured by the n stress sensing elements according to an embodiment of the present invention.

FIG. 9 illustrates circuitry 900 added to the pressure sensor die to read and process the stress data that are measured by the n stress sensing elements. One or more m source/drain leads of each sensing element 960 are connected to a multiplexer (MUX) 950 and one or more n gate electrodes of said sensing elements are connected to the decoder logic (DEC) 960. The appropriate source and drain voltages are multiplexed to the sensing elements and the output signal is amplified by an amplifier (PGA) 920 and then converted to the digital domain using an analog-to-digital converter (ADC) 930. The above-mentioned components are controlled by a digital control circuit 940. The digital output provides a series of digital stress values from the multitude of stress sensing elements.

The measured data can be processed using a package stress compensation approach and algorithm according to an embodiment of the present invention. From a strictly physical standpoint, the underlying problem of internal and/or external package stresses can be described as a diaphragm whose boundary conditions are known in the initial state, i.e., during calibration, but over time whose boundary conditions are changing due to the internal and/or external effects in the package or the package environment. Thus, the exact mechanical state of the diaphragm can be unknown at a given time after the calibration depending on the influence of the package. These changes in the mechanical state are changes in the mechanical clamping of the diaphragm and typically result in a change of the zero offset voltage. This zero offset voltage drift limits the accuracy and performance of the pressure sensors.

Again, the boundary condition of the diaphragm can be approximated using stress sensing elements on the surface of the chip on the silicon bulk close to the diaphragm edge and on the diaphragm close to identical edge. This class of problem is a so-called ill-posed inverse problem and inverse solution techniques can be used to find a solution according to an embodiment of the present invention.

The voltage output of each of the stress sensing elements depicted in FIGS. 2 and 3 is dependent on a variety of factors. Such factors include, but are not limited to, the pressure P applied to the diaphragm and the temperature T. The voltage output $V_{out,i}(P,T)$ of each sensor on the diaphragm can be written as:

$$V_{out,i}(P,T) = V_{zero,i}(T, V_{in}) + S_{V,i}(T) P V_{in} + c_{pkg,i}(T)$$

where $V_{zero,i}(T,V_{in})$, $S_{V,i}(T)$, $V_{in}$, $c_{pkg,i}(T)$ are the zero offset voltage, the voltage related relative pressure sensitivity, the input voltage, and the package stress correction function of the $i^{th}$ sensor on the diaphragm, respectively. Many of the above factors are typically acquired during the calibration of a state-of-the-art pressure sensor and are thus known. These factors include the zero offset voltage $V_{zero,i}(T)$ and its temperature dependence, the pressure sensitivity $S_{V,i}(T)$ and its temperature dependence and the supply voltage is also typically given as an input quantity. The challenge is to determine an accurate package stress correction function $c_{pkg,i}(T)$, which is given as:

$$c_{pkg,i}(T) = \sum_{m=1}^{n} D_m \sigma_m(T)$$

where each of the n sensing elements in addition to primary sensing element i adds to the package stress correction function, and where $D_m$ is a factor obtained during calibration for each part individually or through modeling or experimental methods. The mechanical stress factor $\sigma_m(T)$ of each of the n additional sensing elements is given as:

$$\sigma_m(T) = \frac{\pi_m I_m R_m F_{gc}}{V_{out,m}},$$

where $V_{out,m}$, $\pi_m$, $F_{gc}$, $I_m$, and $R_m$ denote the sensing element voltage signal, the piezoresistance coefficient, a geometrical correction factor, sensing element bias current, and the sensing element resistance, respectively.

Additionally, symmetry considerations can be used to determine which stress-sensing element on the diaphragm is the least influenced by the package. This can be done by monitoring the signal changes on the periphery of the bulk and comparing these signals to an initial state during calibration.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A pressure sensor comprising:
   a silicon diaphragm;
   a frame of thicker bulk silicon physically supporting the diaphragm;
   a first sensing element located in the bulk; and
   a second sensing element located in the diaphragm,
   wherein the first sensing element and the second sensing element each comprise a single transistor having a single gate and more than four source-drain regions.

2. The pressure sensor of claim 1 wherein the second sensing element includes more than four source-drain regions.

3. The pressure sensor of claim 2 further comprising:
   a third pressure sensing element located near a boundary between the bulk and the diaphragm, wherein the third pressure sensing includes more than four source-drain regions.

4. The pressure sensor of claim 3 further comprising:
   circuitry to measure voltages at the first and third sensing elements and to use these voltages to determine an offset of the second sensing element.

5. The pressure sensor of claim 2 further comprising a plastic housing.

6. The pressure sensor of claim 3 wherein the first, second, and third sensing elements each include eight source-drain regions.

7. The pressure sensor of claim 1 wherein the first sensing element includes a nonconductive region located between the source-drain regions.

8. The pressure sensor of claim 1 wherein the first sensing element is used to calibrate an offset voltage of the second sensing element.

9. The pressure sensor of claim 1 wherein the first sensing element and the second sensing element are each used to calibration external parasitic mechanical stresses.

10. A pressure sensor comprising:
    a silicon diaphragm;
    a thicker bulk region physically supporting the diaphragm;
    a first sensing element located in the bulk; and
    a second sensing element located near a boundary between the bulk and the diaphragm;
    a third sensing element located in the diaphragm; and
    circuitry to measure voltages at the first and second sensing elements and to use these measured voltages to determine an offset of the third sensing element.

11. The pressure sensor of claim 10 wherein the first and second sensing elements each comprise a single transistor having a single gate and more than four source-drain regions.

12. The pressure sensor of claim 11 wherein the first and second sensing elements each include a nonconductive region located between the source-drain regions.

13. The pressure sensor of claim 10 further comprising a plastic housing.

14. The pressure sensor of claim 13 wherein the offset of the third sensing element is determined in order to calibrate for stress induced by the plastic housing.

15. The method of claim 10 wherein the first, second, and third sensing elements each include eight source-drain regions.

16. A method of calibrating an offset of a pressure sensor comprising:
    measuring a first voltage of a first sensing element located in a thicker bulk region;
    measuring a second voltage of a second sensing element located in a in a thinner diaphragm region; and
    using the first voltage to calibrate an offset of the second sensing element,
    wherein the first sensing element comprises a single transistor having a single gate and more than four source-drain regions.

17. The method of claim 16 further wherein measuring the first voltage of the first sensing element includes multiplexing the first voltage.

18. The method of claim 17 further wherein measuring the first voltage of the first sensing element further includes amplifying the first voltage.

19. The method of claim 18 further wherein measuring the first voltage of the first sensing element further includes converting the first voltage from an analog signal level to a digital signal domain.

20. A method of calibrating an offset of a pressure sensor comprising:
    measuring a first voltage of a first sensing element located in a thicker bulk region;
    measuring a second voltage of a second sensing element located in a in a thinner diaphragm region;
    using the first voltage to calibrate an offset of the second sensing element,
    measuring a third voltage of a third sensing element located near a boundary between the bulk and the diaphragm; and
    using the first voltage and the third voltage to calibrate an offset of the second sensing element,
    wherein the first sensing element includes more than four source-drain regions, and
    wherein the third sensing element includes more than four source-drain regions.

21. The method of claim 20 wherein the first, second, and third or more sensing elements each include eight source-drain regions.

* * * * *